United States Patent
Smith et al.

(10) Patent No.: US 9,261,200 B2
(45) Date of Patent: Feb. 16, 2016

(54) VALVE MECHANISM WITH FRANGIBLE PLUG

(71) Applicant: Kidde Technologies, Inc., Wilson, NC (US)

(72) Inventors: Paul D. Smith, Camberley (GB); Paul Rennie, Bracknell (GB); Robert G. Dunster, Slough (GB); Paul W. Weller, Slough (GB); Francis T. Clarence, Surrey (GB); Joseph Peoples, Wilson, NC (US)

(73) Assignee: KIDDE TECHNOLOGIES, INC., Wilson, NC (US)

( * ) Notice: Subject to any disclaimer, the term of this patent is extended or adjusted under 35 U.S.C. 154(b) by 97 days.

(21) Appl. No.: 13/837,784

(22) Filed: Mar. 15, 2013

(65) Prior Publication Data

US 2014/0261748 A1  Sep. 18, 2014

(51) Int. Cl.
*F16K 17/14* (2006.01)
*F16K 17/40* (2006.01)
*A62C 13/74* (2006.01)

(52) U.S. Cl.
CPC .............. *F16K 17/403* (2013.01); *F16K 13/04* (2013.01); *A62C 13/74* (2013.01); *Y10T 137/1632* (2015.04)

(58) Field of Classification Search
CPC ....... F16K 17/14; F16K 17/403; F16K 13/04; A62C 13/74
USPC ............ 137/68.11, 68.13, 68.19, 68.3, 68.21, 137/68.27, 68.28, 68.29; 220/89.2
See application file for complete search history.

(56) References Cited

U.S. PATENT DOCUMENTS 3,141,470 A * 7/1964 Lafontaine ................. 137/68.13
7,703,471 B2   4/2010 Edwards

FOREIGN PATENT DOCUMENTS

| EP | 1582789 | 10/2005 |
|---|---|---|
| GB | 567120 | 1/1945 |
| GB | 1378079 | 12/1974 |

* cited by examiner

*Primary Examiner* — Kevin Lee
*Assistant Examiner* — P. Macade Nichols
(74) *Attorney, Agent, or Firm* — Cantor Colburn LLP

(57) ABSTRACT

A valve mechanism is herein described that utilizes a frangible plug. The valve mechanism comprises a valve body having an inlet port and an outlet port and a passageway extending therebetween. The valve mechanism comprises a frangible plug that is held within the valve body to block the passageway when the plug is intact. The plug comprises a predefined fracture plane and is configured to fracture across the predefined fracture plane upon application of an impact force.

8 Claims, 14 Drawing Sheets

VALVE MECHANISM WITH FRANGIBLE PLUG

BACKGROUND

A valve mechanism is described herein, and more particularly a single-use valve mechanism that may be used for discharging fluid. The valve mechanism may have particular use in the field of suppressant release, such as a fire suppressant fluid.

The examples described herein relate to devices and methods for the controlled release of a fluid flow substance. They are particularly suited, but not limited, to the controlled release of a suppressing or extinguishing agent from a cylinder. The devices and methods described may further be used for the rapid deployment of an extinguishing agent from a cylinder, such as those that may typically, although not exclusively, be used on moving platforms such as aircraft, trains, military or commercial vehicles.

Such valves fall into two main groups; non-hermetic and hermetically sealed. The former category is typified by the high rate discharge (HRD) valves used on suppressors in military and commercial vehicles. These can be electromechanical or protractor fired, consisting of either a flapper or poppet as the main opening mechanism. Both systems contain multiple moving components and rely on O-rings seals for integrity.

EP 1582789 describes devices and methods for controlling the release of a substance which are particularly suited to the control of substances such as fire extinguishing media. The devices and methods described comprise a housing having an inlet for connection to a source of a substance and an outlet, with a passage extending therebetween. The passage may be closed by a frangible element which comprises a ceramic disc that is connected to a source of electrical current. The disc may be a metal oxide ceramic disc, and may be fractured by an electrical pulse which is applied to the disc.

GB 1378079 describes a bursting disc assembly, and in particular a vessel having an aperture sealed by the bursting disc assembly. The bursting disc assembly is comprised of toughened glass, that is shattered by a movable spike which is projected against the glass with sufficient force to rupture the surface layer thereof and consequently shatter the disc. The spike is moved via pressure created by the ignition of a pyrotechnic composition.

GB 567120 discloses a quick-release valve arrangement for a container of fluid under pressure which is aimed at enabling fluid to be released in a simple and rapid manner. The valve arrangement comprises a hollow body or casing formed with a valve seat as well as a valve that is shaped to fit upon the valve seat to seal up the passage leading from the fluid container. A frangible disc, which may be formed from cast iron, pottery, glass or brittle plastic, is located within the valve body and spaced from the valve proper by a strut member which serves to hold the valve down on its seat. The device also includes a plunger that is used to shatter the disc and release the valve. The disc may also be shattered in other ways such as by providing an explosive charge or via a small projectile driven by the explosion striking the disc.

U.S. Pat. No. 7,703,471 discloses a remotely-operated single-action discharge valve for releasing gaseous, liquid, or dry material from a pressurized storage vessel. A frangible seal is provided within a valve body which seals the passage therethrough when the seal is intact. A solenoid is described which includes an armature moveable from a first position to a second position when the solenoid is actuated. The device includes a tooth, teeth or a pin or plurality of pins which break the frangible seal as the armature moves between the first and second position. The seals described are held in place using an o-ring and can be made of glass.

SUMMARY

A valve mechanism is herein described that utilises a frangible plug. A device and method that minimizes the number of fragments generated when the frangible plug is fractured is also herein described. Means for preventing blockage of the outlet port of a valve body is also described as well as a new method of forming a seal in a valve mechanism.

Examples of valve mechanisms are described which comprise a valve body having an inlet port and an outlet port and a passage extending therebetween. The valve mechanisms may comprise a frangible plug that is held within the valve body to block the passageway when the plug is intact. In an example described herein, the plug comprises a predefined fracture plane. The plug may further be configured to fracture across the predefined fracture plane upon application of an impact force.

The valve mechanisms described may also comprise means for facilitating fracture of the plug. The means for facilitating fracture of the plug may comprise means to provide an impact force to the plug, and thereby break the seal within the passage. In one example, this may be adapted to provide the impact force to at least one point on the predefined fracture plane. This impact force may be applied to any point on the plug, or to at least one point on the fracture plane of the plug. The force may be applied at any angle. The means for providing an impact force to the frangible plug may comprise a Metron™ protractor, an electro-mechanical means, a mechanical means or a pneumatic or hydraulic means.

The plug of the valve mechanism described herein may comprise a first end and an opposing second end and a cylindrical sidewall having an outer surface extending therebetween. In use, the first end is on the outlet port side of the valve body and the second end is on the inlet port side of the valve body. The predefined fracture plane may intersect the side wall of the plug to provide a predetermined fracture line that extends around the circumference of the outer surface of the sidewall of the frangible plug. The plug may therefore be broken by applying the impact force to at least one point on this fracture line, as described above.

The plug may alternatively be broken by applying the impact force to any other point on the plug.

The predefined fracture plane in the examples described may lie generally perpendicular to the direction of fluid flow through the inlet port when the plug is positioned within the valve body.

The plug may further comprise a first surface at the first end of the plug which, in use, is in flow communication with the outlet port of the valve body and a second surface at the second end of the plug, which, in use, is in flow communication with the inlet port of the valve body. In an example described herein, the second surface comprises a recess, having an open end at the second surface and a closed end within the plug, with the inner surface of the cylindrical sidewall extending therebetween. In one example, the diameter of the recess may be smaller at the closed end of the recess than at the open end of the recess.

The recess therefore extends inwardly of the plug, in the direction of the first end. In an example described herein, the outer surface of the sidewall may have a first bevelled portion and the inner surface of the sidewall may have a second bevelled portion. The part of the bevelled portion of the outer surface that has the smallest diameter may lie in the same plane as the part of the bevelled portion of the inner surface that has the greatest diameter. In this example, this plane also corresponds to the predefined fracture plane.

This example results in a plug that has a 'top hat' shape. Other plugs could, however, be used, that are not top hat shaped, but which are formed in such a way that they still comprise a predefined fracture plane.

The plug may also be brittle and thereby permit an opening between the inlet and outlet ports of the valve through brittle fracture of the plug across the predefined fracture plane. The plug may also be formed from a number of different materials. In one example, the plug may be formed from a brittle ceramic material, such as alumina. In other examples, the plug may be formed from Cordierite, Zirconia, Magnesia Stabilised Zirconia (MSZ), Mullite, Yittria Stabilised Zirconia (YTZP), Zirconium Toughened Alumina (ZTA), non ceramic composites i.e. graphite matrix materials or laminates of ceramic/metal or ceramic/polymer, although they are not limited to these materials.

Means for minimizing the size and/or number of fragments produced by a frangible plug upon fracture is also herein described. In an example described herein, this comprises an encapsulating means for encapsulating a section of the plug, the encapsulating means being configured to retain that section of the plug therein upon fracture of the plug across the predefined fracture plane.

The encapsulating means may comprise a material that is of sufficient strength to not shatter or break during fracture of the frangible plug.

In some examples, the encapsulating means comprises a cap, which may, in one example, be made from a lightweight metal such as aluminium. In other examples, the cap may be made from a different material. The cap may further be held in place on a surface of the plug with an adhesive such as epoxy resin. In other examples, the encapsulating means may comprise a semi-flexible potting compound, such as silicone. Alternatively, the encapsulating means may comprise a lamination or a coating.

Any of the examples of encapsulating means described herein may be used with any shape or type of frangible plug, either with or without a predefined facture plane.

In some examples, the plug may comprise a first end and an opposing second end and a cylindrical sidewall having an outer surface extending therebetween. A seal may further be provided between a portion of the plug and the valve body. In some examples, the seal may be between the outer circumference of the sidewall of the plug and the valve body. The predefined fracture plane intersects the sidewall of the plug to provide a first section on one side of the plane, which comprises this seal, and a second section, on the opposite side of the fracture plane which does not comprise this seal. The means for minimizing the size and/or number of fragments produced by the frangible plug may cover at least a part of a surface of this second section.

The encapsulating means may be provided on an exterior surface of the plug. In one example, the encapsulating means may be provided on the exterior surface of the second section of the plug. In another example, wherein the plug comprises an internal recess, the encapsulating means may also be provided on the interior surface of the recess of the second section of the plug.

The encapsulating means may also cover and encapsulate the entire outer surface of the second section of the plug or the entire exterior and interior surface of the second section of the plug.

In an example herein described, the second section of the plug that breaks away from the section of plug that comprises the seal in the passageway is provided at the first end of the plug, i.e. the end of the plug that is in flow communication with the outlet port of the valve body. In this example, the means for minimizing the size and/or number of fragments produced may therefore be positioned on the outlet port side of the predefined fracture plane of the plug.

In one example, wherein the plug has a predefined fracture plane, the encapsulating means covers and encapsulates the entire outer surface of the second section of the plug, i.e. the section that lies on the outlet port side of the predefined fracture plane.

In another example, wherein the plug has a predefined fracture plane, the encapsulating means additionally covers and encapsulates the entire inner surface of the recess of the second section of the plug, i.e. the section that lies on the outlet port side of the predefined fracture plane.

Examples of different means for retaining, within the valve body after fracture of the plug, the encapsulating means which contains the second section of the plug, i.e. that which has broken away from the remainder of the plug, are also herein described.

A valve mechanism is also described herein which comprises a means for retaining, after fracture of the plug, the encapsulating means in a position within the valve body that does not lie in the flowpath between the inlet and the outlet port.

In some of the examples described herein, the retaining means may comprise a retention cavity that is formed in the valve body in a position that does not lie in the flowpath between the inlet and outlet port, for retaining, after fracture of the plug, the encapsulating means in a position within the valve body that does not lie in the flowpath between the inlet and the outlet port.

In some of the examples described herein, the retention cavity may have an entrance and the plug may be positioned within the valve body so that it is axially aligned with the entrance to the cavity. The retention cavity may further comprise means for gripping and thereby retaining the encapsulating means in the cavity and therefore in a position within the valve body that does not lie in the flowpath between the inlet and outlet ports, after fracture of the plug.

In some of the examples described herein, the means for gripping the encapsulating means after fracture of the plug comprises the retention cavity having a diameter that decreases in the direction away from the entrance to the cavity, the diameter decreasing to a diameter that corresponds to the diameter of the encapsulating means, to thereby grip and retain the encapsulating means in a position within the valve body that does not lie in the flowpath between the inlet and outlet ports, after fracture of the plug.

In an example described herein, the valve body may comprise a first end and an opposing second end, with a longitudinal axis extending therebetween. The inlet port may be provided at the second end of the valve body and the outlet port may be located between the first end and second end of the valve body. The retention cavity may be formed between the outlet port and the first end of the valve body and the diameter of the retention cavity decreases in the direction of the first end of the valve body, to have a diameter and/or shape that corresponds to the diameter and/or shape of the encapsulating means, to thereby grip and retain the encapsulating means in a position within the valve body that does not lie in the flowpath between the inlet and outlet ports, after fracture of the plug.

In some of the examples described herein, the means for gripping the encapsulating means after fracture of the plug may comprise a retainer that is provided in the cavity, wherein the retainer and/or encapsulating means are deformable, to thereby grip the encapsulating means and retain it in a position within the valve body that does not lie in the flowpath between the inlet and outlet ports, after fracture of the plug.

In some of the examples described herein, the retainer may be a rubber or elastomer retainer. In another example, the retainer may be a crinkle ring or washer. In other examples, the encapsulating means can be made from a deformable material. Due to these features being able to deform, the retainer is therefore able to gip the encapsulating means and retain it in the retention cavity.

In one example, the valve body comprises a first end and an opposing second end with a longitudinal axis extending therebetween. The inlet port is provided at the second end of the valve body and the outlet port is located between the first end and second ends of the valve body. The retention cavity is formed between the outlet port and the first end of the valve body and in this example, the retention cavity comprises a retainer provided therein that grips the encapsulating means and retains it in a position within the valve body that does not lie in the flowpath between the inlet and outlet ports, after fracture of the plug. In this example, either the retainer or the encapsulating means or both are deformable.

In a further example, the retention means may further comprise an attachment means in the form of a spring that is attached to both an inner surface of the valve body and the encapsulating means, to retain the encapsulating means in a position that does not lie in the flowpath between the inlet and outlet ports, after fracture of the plug.

In some examples described herein, the spring may be used in conjunction with a retention cavity and the inner surface to which the spring is attached may comprise an inner surface of the retention cavity.

In another example, the retention means may comprise an attachment means in the form of a magnetic force that is provided between an inner surface of the valve body and the encapsulating means to thereby retain the encapsulating means, after fracture of the plug, in a position within the valve body that does not lie in the flowpath between the inlet and outlet ports. In one example, the encapsulating means may be made of a magnetic material and a magnet may be provided on or within an inner surface of the valve body, to attract the encapsulating means. In another example, a magnetic material may be provided on or within the inner surface of the valve body and the magnet may be provided on the encapsulating means. The magnet may be a permanent magnet or an electro magnet.

In some of the examples described herein, the magnetic force may be used in conjunction with a retention cavity and may be provided between a surface of the retention cavity and the encapsulating means.

Also described herein is a new type of hermetic seal and method for forming that seal which can be used in any fire extinguisher valve mechanism. In one example, the plug may comprise a first end and an opposing second end and a cylindrical sidewall, having an outer surface extending therebetween. The predefined fracture plane may intersect the sidewall of the plug to provide a first section on one side of the plane, the first section comprising the second end, and a second section, on the opposite side of the fracture plane, the second section comprising the first end. The plug may further be positioned within the passageway so that the first end is in flow communication with the outlet port and the second end is in flow communication with the inlet port. The valve mechanism may further comprise a metal ring, the metal ring being bonded to the first section of said plug and also being bonded to the passageway, to thereby provide a seal between the first section of the plug and the passageway of the valve body.

In some of the examples described herein, a metal support ring may be directly bonded to the frangible plug.

In some of the examples described herein, a metal support ring may be provided on the first section of the plug and may have a size and shape that follows the contours of the outer surface of this section of the plug on which it is provided.

In some of the examples described herein, the metal support ring may comprise a hollow cylinder that is open at both ends. The inner surface of the ring may be bonded to both the outer cylindrical sidewall of the frangible plug and the outer surface of a welding ring, to thereby form the seal within the passageway.

The ring may further comprise a first portion of generally uniform diameter and a second, bevelled portion, which has a decreasing diameter in the direction away from the first portion, and thereby follow the contours of the plug's cylindrical sidewall. The first portion of generally uniform diameter may cover a part of the corresponding cylindrical portion of the outer surface of the plug. The second, bevelled portion of the metal ring may cover a part of the corresponding bevelled portion of the plug.

In some of the examples described herein, the metal support ring does not cover the point at which the predefined fracture plane intersects the side wall of the plug.

In some of the examples described herein, a nominal gap is provided between the frangible plug and the welding ring.

In some of the examples described herein, the metal support ring may comprise a first side and an opposing second side and an outer sidewall and an inner sidewall which extend circumferentially therebetween, and wherein a channel is formed in the first side and wherein the channel is sized and shaped so as to reflect the size and shape of the second end of the plug. The plug may be slotted into the channel and bonded to a surface of the channel and the ring may further be bonded to the welding ring, to thereby provide a seal within the passageway.

The method for forming the hermetic seal may comprise forming a direct bond between the metal support ring and the material of the frangible plug, followed by bonding the metal support ring to the valve body to form the hermetic seal in the passageway.

In some of the examples described herein, the frangible plug may be formed from a brittle ceramic, vitreous or polymeric material. For an alumina ceramic disc, the material may comprise a 42% NiFe alloy (i.e. NiLo alloy 42). The direct bond between the metal support ring and the frangible plug may be formed using a brazing technique. This brazing technique may comprise the 'moly-manganese' process, however, other techniques may also be used. The direct bond between the metal support ring and the frangible plug may also be formed using an adhesive.

The metal support ring may be made from a metal that has a thermal expansion coefficient that closely matches the thermal expansion coefficient of the frangible plug. In one example, the frangible plug may comprise an alumina ceramic and the metal ring may comprise Invar™ or Kovar™.

Standard precision welding techniques, such as TIG, electron beam or laser may be used to attach the metal support to the valve body. Other techniques may also be used.

The welding ring may be formed from mild steel, aluminium, stainless steel, titanium or nickel to facilitate welding to a mild steel cylinder. The alloy for the welding ring to bond to a cylinder may also be made from the same materials.

Any of the valve mechanisms and various features related thereto described herein may be used in a fire extinguishing or suppressor device.

BRIEF DESCRIPTION OF THE DRAWINGS

Examples of an improved frangible plug for use in a valve mechanism, a device for minimizing the number of fragments produced from a fractured frangible plug, a means for retaining a detached part of the plug and an improved seal for a frangible plug are herein described with reference to the accompanying drawings, in which.

DETAILED DESCRIPTION

Figure 1:
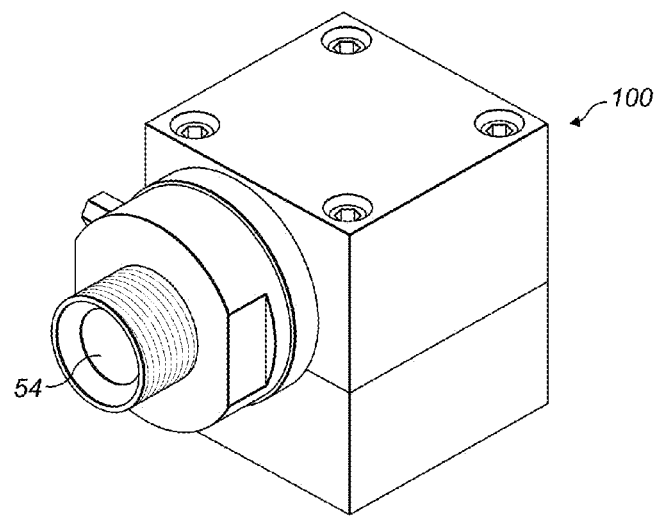
FIG. 1 shows an external view of a valve body.
Figure 2:
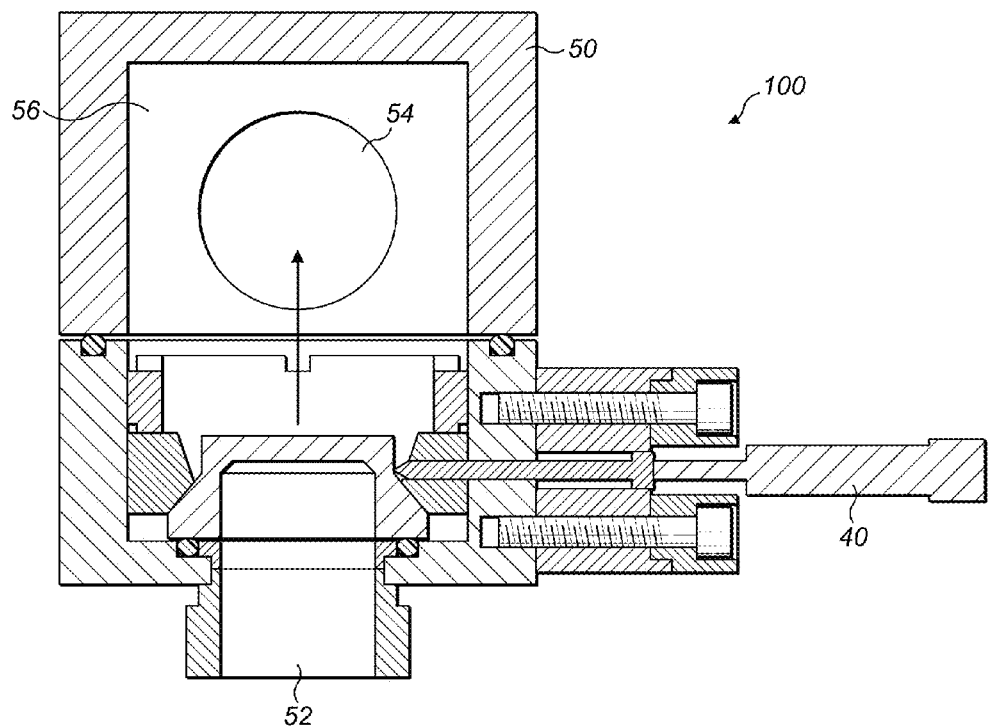
FIG. 2 shows the internal features of the valve body of FIG. 1 from a first cross-sectional view.
Figure 3:
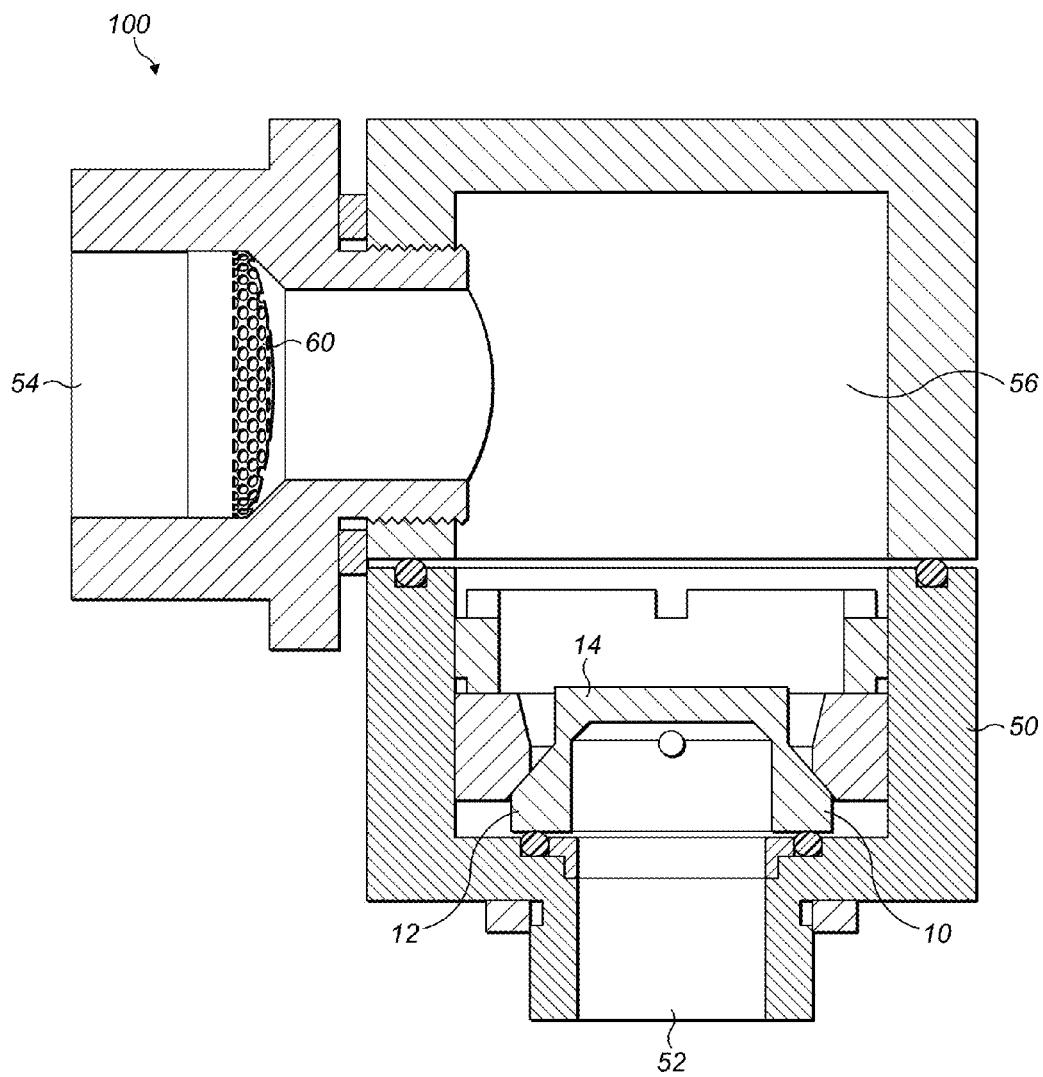
FIG. 3 shows the internal features of the valve body of FIGS. 1 and 2 from a second cross-sectional view.

A valve mechanism, 100, is shown in FIGS. 1 to 3 that comprises a valve body, 50, having an inlet port, 52, and an outlet port, 54, and a passageway, 56, extending therebetween. A frangible plug, 10, is held within the valve body, 50, to block the passageway, 56, between the inlet and outlet ports, and prevent fluid from flowing from the inlet port, 52, to the outlet port, 54 when the plug is intact.

The frangible plug described herein may be formed from a brittle ceramic material, for example alumina, but may also be formed from any similarly brittle vitreous or polymeric material.

One example of a frangible plug described herein and shown in FIGS. 3 to 6 is in the general shape of a 'top hat'. In this example, the plug is seen as having a continuous, closed first surface which is generally flat, 13, at the first end, 14, (see FIG. 4) which, in use, is in flow communication with the outlet port, 54 (see FIGS. 2 and 3). Although the first surface of the plug is described herein as being flat, this is not necessary, and the surface could be any other shape such as curved, or dome shaped. The plug also has an opposing second end, 12, which is at the inlet port side of the valve mechanism and which has a second surface, which, in use, is in flow communication with the inlet port, 52. The outer perimeter of the surfaces at the first and second ends of the plug are generally circular in this embodiment, however, other shapes could be used, depending on the chosen design. The plug further has a side wall, 16, with an outer surface, 30, which extends cylindrically between the first and second opposing ends.

In some examples, the outer circumferential surface of the sidewall, 16, of at least a portion of the plug may contact the inner wall of the valve body itself, or may be held by some other means within the valve body and may further comprise a seal between the outer circumference of the sidewall of the plug and the valve body and/or between the second end of the plug and/or the sidewalls of the recess within the plug (as described later).

This, in combination with the fact that the first end of the plug is closed, provides a seal between the inlet and outlet ports of the valve body, which therefore closes the passageway between the inlet, 52, and outlet, 54, ports.

Figure 4:
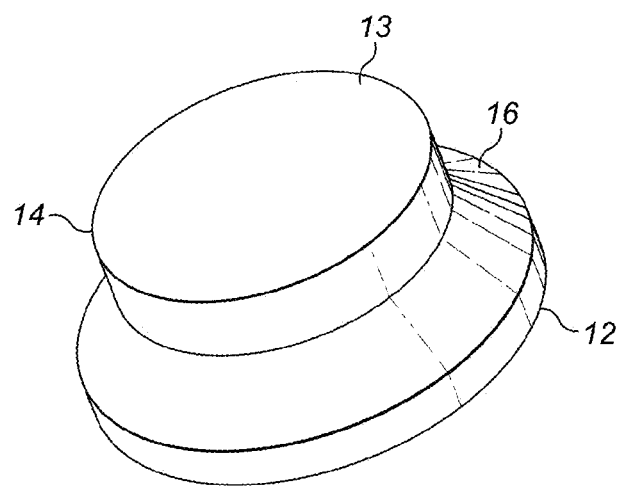
FIG. 4 shows a view of a 'top hat' shaped frangible plug.
Figure 5:
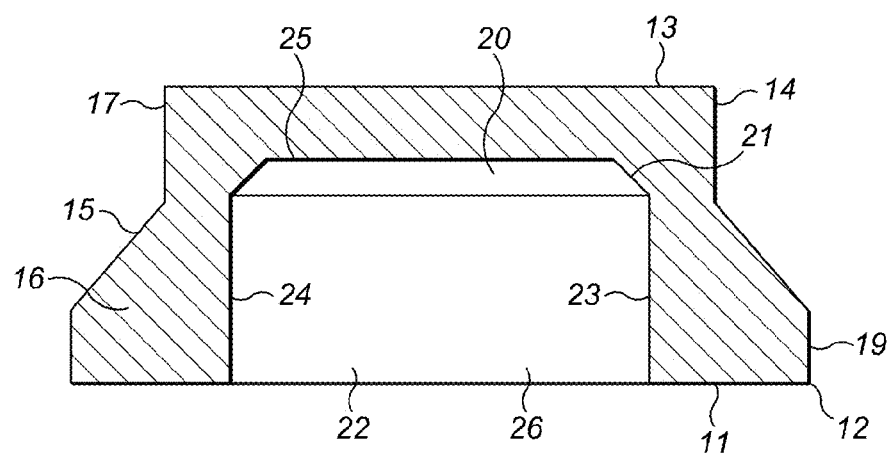
FIG. 5 shows a side, cross-sectional view of the 'top hat' shaped plug of FIG. 4.
Figure 6:
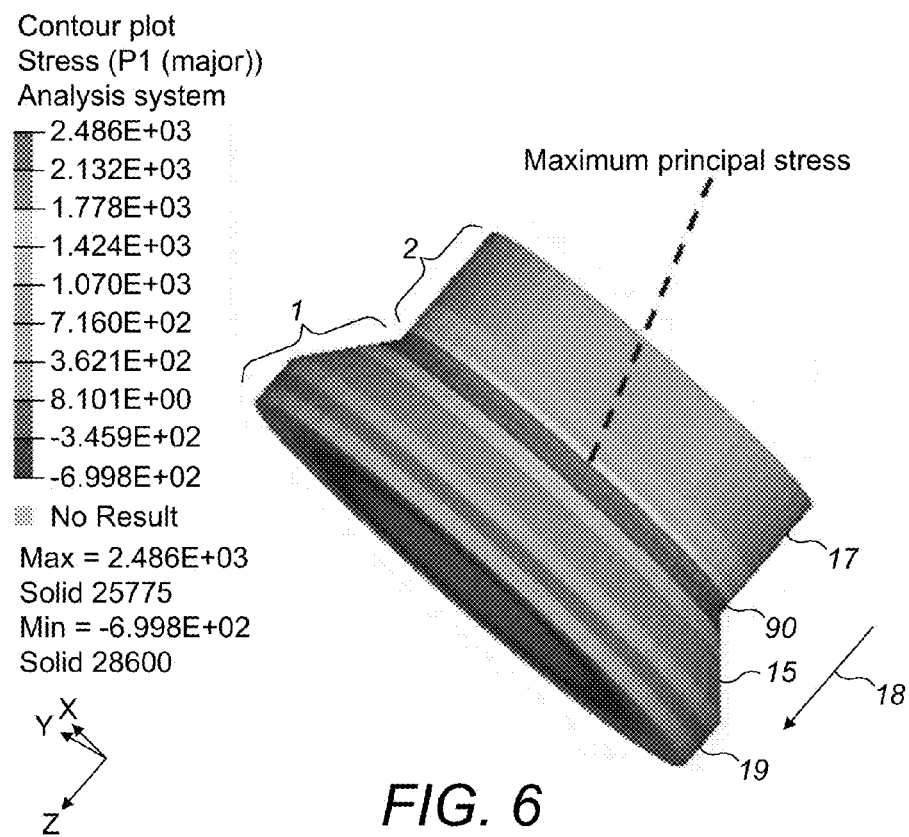
FIG. 6 shows, via Finite Element Analysis (FEA) the principle stress distribution of the plug shown in FIGS. 4 and 5 when a uniform pressure is applied to the part of the plug that is in flow communication with the inlet port of a valve.

In detail, the outer surface, 30, of the side wall, 16 of the plug shown in FIGS. 4 to 6 comprises three portions, 15, 17, 19, each with different diameters and therefore circumferences to each other. As can be seen in FIGS. 4 to 6, there is a portion of substantially uniform diameter and circumference at either end of the plug, 17, 19, with a first angled or bevelled portion, or flange, of increasing/decreasing diameter therebetween, 15. The circumference of the cylindrical portion at the second end is also greater than that of the first end, thereby creating what would be the 'brim' of the top hat shape. Although the end portions of the outer surface of the sidewall of the example shown herein are of generally uniform diameter, the diameter does not have to be completely uniform.

It can therefore be said that the outer surface of the side wall, 16, has a first, generally uniform diameter cylindrical portion, 17, which extends from the first end of the plug, 14, in the direction, 18, towards the second end, 12 (see FIG. 6). The diameter of the outer surface of the sidewall is at its smallest in this portion.

A second portion, 15, of the sidewall which is connected to the first portion, is bevelled and extends at an angle outwardly from the first portion, thereby comprising an increasing diameter in the direction, 18, of the second end, 12. The diameter of this second portion increases in the direction of the second end of the plug until it contacts the third portion, 19, which is again, generally uniform in diameter and cylindrical in shape and also extends generally parallel to the first portion, 17, of the outer side wall. This third portion therefore constitutes a flange, or the 'brim' of the top hat shape and in the example shown has a generally uniform diameter. The outer diameter of the sidewall, 16, is at its greatest in this portion.

As described above, the plug has a first, closed, continuous surface, 13, at a first end, 14, however, the opposing, second surface, 11, at the second end, 12, of the plug comprises a cylindrical recess, 22, which is seen in FIG. 5 as being positioned approximately in its centre.

As seen in FIGS. 4 to 6, the recess, 22, has an open end, 26, at the second end of the plug, a closed end, 20, within the plug, and an inner surface, 23, of the cylindrical sidewall, 16, extending therebetween. As can be seen in FIG. 5, the diameter and circumference of the cylindrical wall at the closed end, 20, of the recess is smaller than the diameter and circumference of the wall at the open end, 26.

In greater detail, the cylindrical recess, 22, is formed by the sidewalls having an inner surface that extends from the second surface, 11, at the second end, 12, of the plug in the direction of the first end. The inner surface, or sidewall, 23, within the recess of the plug comprises a first portion, 24, which extends cylindrically and is of generally uniform diameter from the second end and second surface of the plug. This first portion, 24, of the inner surface of the sidewall also extends in a direction that is generally parallel to the end portions, 17, 19, of the outer surface of the sidewall, as described above, although this is not necessary. The inner surface, 23, of the sidewall also comprises a second portion which is bevelled, 21, wherein the diameter decreases in the direction of the first end, 14, of the plug and the surface, 25, at the closed end, 20, of the recess, 22.

The recess therefore terminates in a closed end, 20, having a surface, 25, that has a smaller diameter and circumference than the open end, 26, of the recess at the second surface, 11. In the figures, the surface at the closed end, 20, of the recess, 22, is shown as being flat, however, this is not necessary and any shaped surface can be used.

As described above, the outer surface of the sidewall, 16, has a first bevelled portion, 15 and the inner surface, 23, of the side wall has a second bevelled portion, 21. As can be seen in the figures, the part of the bevelled portion of the outer surface that has the smallest diameter lies in the same plane as the part of the bevelled portion of the inner surface that has the greatest diameter.

Due to the shape of the plug described, where the outer and inner surface of the sidewall have an abrupt change in their geometric shape, and in particular, due to the fact that the part of the bevelled portion on the outer surface of the sidewall that has the smallest diameter lies generally in the same plane as the part of the bevelled portion of the inner surface of the sidewall that has the greatest diameter, when a uniform pressure is applied to the second end, 12, of the plug, (which is in flow communication with the inlet port), and in particular, the recess, 22, the stress created is therefore concentrated in a predetermined plane. This results in a plane of principle, or increased stress, (relative to the surrounding areas), 90.

The thickness of the sidewall of the plug is at its minimum in this plane, due to the relative positions of the bevelled portions present of the outer surface of the sidewall and the inner surface of the sidewall of the recess and their corresponding diameters and circumferences, as seen in FIG. 5.

Further, due to the fact that the bevelled portion within the recess decreases the circumference of the cylindrical inner surface of the sidewall at the closed end of the recess, the surface area upon which the force from the substance to be discharged is exerted is decreased, thereby increasing stress concentrations even further.

The intersection of this predefined plane with the outer surface of the side wall of the plug can be seen in FIG. 6, which shows the principle stress distribution of the plug when a uniform pressure is applied to the inlet end, 12, of the plug.

This predefined plane, 90, therefore provides a weak area of the plug, 10, that intersects both the inner surface, 23 (within the recess, 22) and the outer surface, 16, of the side wall of the plug, and can be seen in FIG. 6 as a circumferential line of weakness, 90, extending around the side wall of the plug. This predefined plane, 90, is therefore referred to herein as a predefined fracture plane, as it predefines the location and form of brittle fracture of the plug.

As shown in FIGS. 1 to 3, the valve mechanism also comprises means, 40, for facilitating breakage or fracture of the plug. A number of different means for facilitating breakage could be used, however, in the examples described and shown herein this comprises means for providing an impact force to the plug. This may be at least one protractor, for example a Metron™ protractor, but may also be delivered by any suitable electro-mechanical, mechanical or pneumatic/hydraulic, or other impact means.

In theory, the impact force may be applied to the plug at any angle. In one example, the impact force is applied to at least one point on the plug that corresponds to, or is in contact with, the predefined fracture plane, as described above. In another example, the impact force is applied parallel to the predetermined fracture plane, 90.

Figure 7:
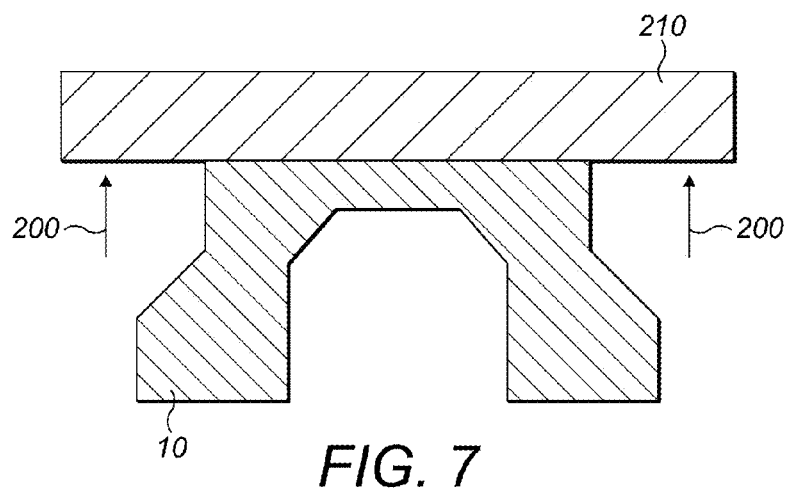
FIG. 7 shows another example of a plug described herein.

In one example, the plug may be formed as described above, but may also comprise a flange, 210, provided at its first end, 14, as shown in FIG. 7. The impact force may, in this example, be applied to this flange in order to cause fracture of the plug across the predefined fracture plane. In the example shown in FIG. 7, the impact force may be applied to the underside of this flange, in a direction, 200, perpendicular to the fracture plane. The impact force may also be applied in any other direction.

As described above, the plug, 10, as shown in FIGS. 1 and 2 is held within the valve body so that a portion of the outer surface of the plug is sealed to an inner surface of the valve body. This may be achieved either by the use of the outer sidewall surface, 16, of the plug contacting the valve body inner walls itself, and/or via the use of an O-ring, for example. Other sealing means may also be used, as described later.

The predefined fracture plane, 90, intersects the side wall, 16, of the plug to provide two sections, 1, 2, one either side of the plane, see FIG. 6. The seal between the plug and the valve body, 50, is provided in only one of these sections, i.e. the first section, 1, as shown in FIG. 6. In the examples shown in FIGS. 1 to 3, this is the section of the plug that is on the inlet port side of the predefined fracture plane, which comprises the bevelled portion, 15, of the outer surface, as well as the portion, 19, of the outer surface that is at the second end, 12, of the plug, that has a uniform diameter which is greater than the diameter at the first end, 14, of the plug (i.e. the 'brim' of the top hat shape). This first section also comprises the portion, 24, of the recess, 22, which is of uniform diameter and extends from the second end of the plug up to the point at which the inner surface of the sidewall is bevelled (see FIG. 5).

Upon application of an impact force to the plug, and more particularly, to a point on the predefined fracture plane, 90, fracture of the plug therefore occurs across this predefined fracture plane and this entire second section, 2, of the plug that lies on the side of the plane, 90, that is not sealed to the inner walls of the valve body, 50, and which, in this example, has a smaller outer diameter than the remainder of the plug, breaks away and may fragment. The first section of the plug that comprises the seal to the inner surface of the valve body generally stays intact. This therefore provides a clear open aperture at a predefined position within the plug.

Due to the creation of this clear aperture, the passageway between the inlet and outlet ports is opened up so that the substance contained in the inlet can be discharged through the outlet port.

The provision of an impact force to a plug having a predefined fracture plane therefore results in a much cleaner break than to a plug that does not have such a predefined fracture plane.

Although a frangible plug having a top hat shape is described herein, it should be appreciated that this is just one example of a general approach to create a predefined fracture plane, 90, by generating a stress concentration in the structure of the plug, 10. Alternative shapes for the frangible plug may also therefore be envisaged which would achieve the same result.

The valve mechanism described above is therefore a single-use, or repairable, valve mechanism that provides significant advantages over previous valve mechanisms, as when operated, it is able to create a clear opening between the inlet, 52, and outlet, 54, ports of the valve due to the fact that the plug has a predefined fracture plane, 90. Since the fracture plane is predefined, the location of the eventual brittle fracture by either overpressure in the valve, or impact force being applied to the frangible plug is also predefined. In addition to this, the predefined fracture plane, 90, in the example described lies generally perpendicular to the direction of the flow direction and so the resistance of the frangible plug to bursting or fracture due to applied pressure on the side of the inlet port, 52, is maximised.

This valve mechanism also allows for the minimisation of the number of components and the complexity of the valve design, thereby reducing the cost of the valve mechanism. It further retains the rapid opening and free flow characteristics of known devices and methods, whilst removing the need for pyrotechnic cartridges and providing the option for hermiticity where required.

Fracture of a frangible plug, however, (either by overpressure, or through the action of any other means such as an impact force, electro mechanical, chemical etc.) can result in the frangible plug being broken up into a number of fragments. It is usually the upper, second section of the plug, i.e. the portion of the plug that does not comprise the seal between itself and the valve body that breaks apart from the remaining section and breaks up into a number of fragments.

As described above, upon fracture, the first section, 1, of the plug, 10, that is sealed to the inner surface of the valve body, 50, generally stays intact, whereas the second section that does not comprise a seal to the valve body is released upon fracture along the predefined fracture plane, 90, and generally fragments. In the examples shown in FIGS. 1 to 6, this corresponds to the first end of the plug that is at the outlet port side of the predefined fracture plane.

Often, a valve body may further comprise filter means for capturing fragments, in the form of a fine mesh, 60, positioned at the outlet port, 54, of the valve (see FIG. 3). Several large fragments and/or an excessive number of smaller fragments will still present a risk to the mesh, 60, becoming at least partially blocked, however, thus reducing the flow of fluid at the outlet of the valve.

It would therefore be advantageous to reduce the size and number of fragments produced on fracture and therefore prevent or at least minimize the chance of the mesh becoming blocked by such small fragments.

An improved method and means for minimising the size and number of fragments generated when a frangible plug is fractured is therefore herein described.

This new means for minimizing the size and/or number of fragments is therefore provided on at least a part of the frangible plug that usually fragments and detaches from the rest of the plug upon fracture. As described above, in the example shown in FIGS. 1 to 6, this corresponds to the second section of the plug, 2, which is on the outlet port side of the fracture plane.

One example of a means for minimizing the size and number of fragments produced upon fracture may comprise encapsulating means that therefore encapsulates at least a part of the section of the frangible plug that usually fragments and detaches from the rest of the plug upon fracture. In the example just described, the encapsulating means may therefore cover at least a part of the external surface of this second section of the plug. The encapsulating means may further additionally cover the interior surface in the recess of the plug.

Figure 8:
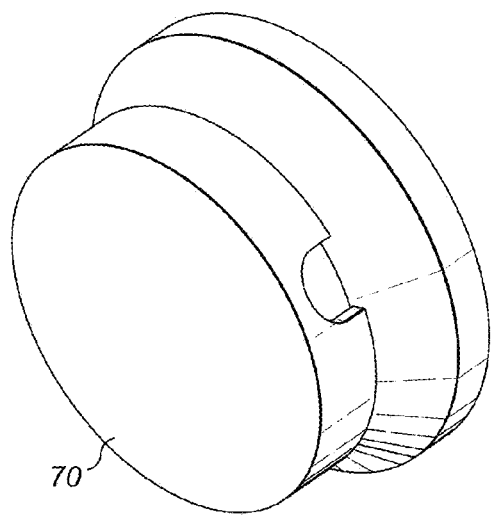
FIG. 8 shows a view of an intact frangible plug for use in a valve mechanism, with an encapsulating cap provided thereon.
Figure 9:
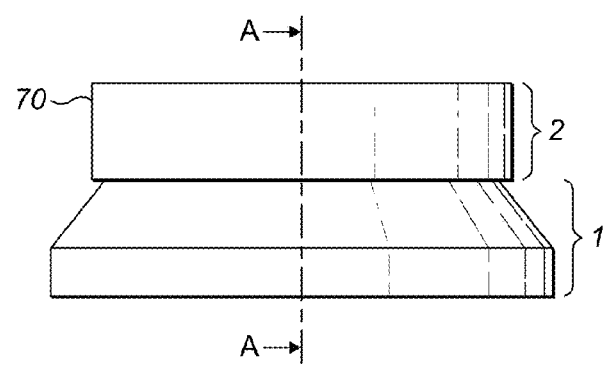
FIG. 9 shows a side view of the encapsulating cap and frangible plug of FIG. 8.
Figure 10:
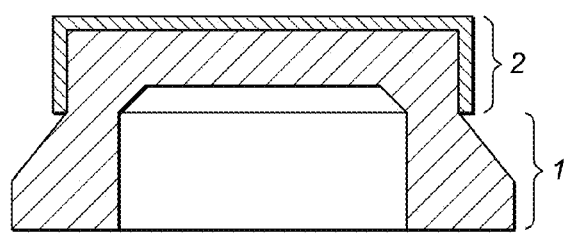
FIG. 10 shows a cross-sectional view of the encapsulating cap and frangible plug of FIGS. 8 and 9.

In one example, the encapsulating means comprises a cap, 70, which may be formed from a lightweight metal, for example aluminium, (FIGS. 8 to 10). Other materials may also be considered for the cap, 70, the criteria being that the cap material must have sufficient rigidity/strength not to shatter or break during fracture of the frangible plug, 10. These materials include a range of alternative metals and polymers.

The cap, 70, can further be held in place on the surface of the plug with an adhesive, such as epoxy resin, which also provides the further advantage in that it also acts as a further means of retaining the fragments within the cap.

The use of a semi-flexible potting compound successfully reduces the size and number of fragments that are produced when the frangible plug has fractured.

A further advantage is that the coating/encapsulating means may also perform the function of providing a gas impervious seal for a porous ceramic material.

The means for minimizing the number and/or size of the fragments produced by the plug on fracture is not limited to a cap or a flexible potting compound, but could also include encapsulating of the releasable second portion of the plug by lamination or coating.

In addition to this, the encapsulating means could be provided on both the exterior and interior surfaces of the plug, for example, by also being provided on the inner, closed end surface, 20, and/or sidewalls within the recess of the plug (not shown). In the example wherein the plug has a predefined fracture plane, the encapsulating means should be provided only on the releasable, second section, 2, of the plug that lies on the side of the fracture plane, 90, that is not sealed to or in contact with the valve body, so as to not interfere with the clean break created by the predefined fracture plane. In the examples described herein, this is the portion of the plug that lies on the outlet port side of the plane.

As described above, when the frangible plug is broken, the plug fractures across the predefined fracture plane and the releasable section of the plug breaks away, fragments, and is forced, (due to the flow of the substance travelling from the inlet port and out through the outlet port) into the outlet port side of the valve body.

When an encapsulating means such as described above (a cap, 70, for example), is used that covers the entire outer surface of the second, releasable section of the plug, up to the point at which the predefined fracture plane, 90, lies, upon actuation of the impact force, the plug fractures along the predefined fracture plane, 90, to form a clear aperture in the plug, and the entire second section, 2, of the plug that is on the outlet port side, 54, of the predefined fracture plane, 90, breaks away from the remaining section, 1, of the plug and instead of fragmenting, is instead retained within the encapsulating cap (or other encapsulating means) and little or no debris is created that may then block the outlet port.

Although the examples are described herein as being used in conjunction with the top hat shaped frangible plug described above and with reference to FIGS. 4 to 6, this new method and means could also be used with other shaped plugs that also have a predefined fracture plane, or even with standard frangible plugs that do not have a predefined fracture plane. In an example wherein the plug does not have a predefined fracture plane, the means for minimizing the size and number of fragments can be positioned on the part of the plug that the user would most likely expect to fragment.

Since this detached encapsulating means, with the second section of the plug retained therein, is quite large in comparison to the normal fragments produced upon fracture of the plug, there is a possibility that this may result in blockage of the outlet port.

Means are also therefore herein described which prevent this detached, encapsulated section of the plug from restricting the outlet port of the valve after fracture.

Some examples of such means are provided in FIGS. 11 to 14. These act to prevent obstruction of the outlet port, 54, by retaining the detached, encapsulated section, 2, of the plug away from the outlet port, 54, and, in particular, out of the flowpath, 59, within the passageway, 56, via which the substance to be discharged travels from the inlet port, 52, and to the outlet port, 54.

In some examples, the retention means may comprise a retention cavity, 74, formed within the valve body. In some examples, this may be provided in the valve body in a position that does not lie in the flowpath between the inlet and outlet port, for retaining, after fracture of the plug, the encapsulating means in a position within the valve body that does not lie in the flowpath between the inlet and outlet ports.

Figure 11:
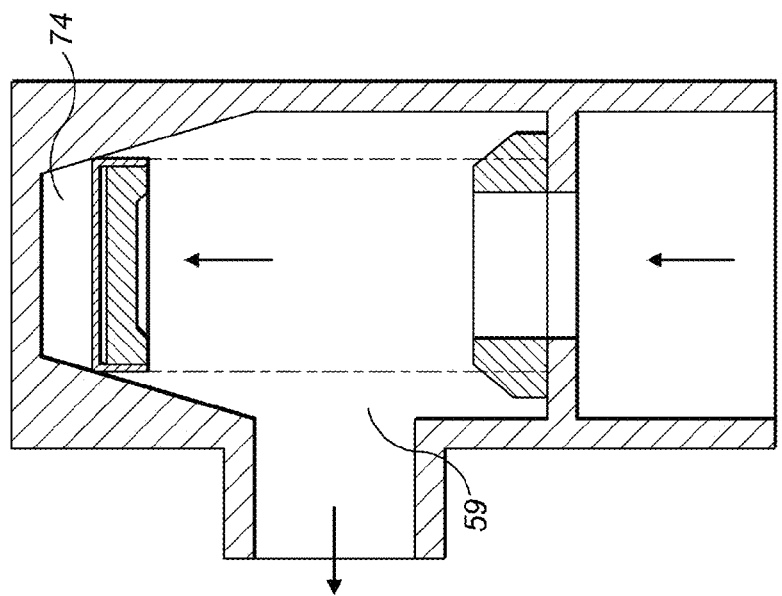
FIG. 11 shows an example of a means for retaining an encapsulating means within a valve body following fracture of the plug wherein the retention means is tapered.
Figure 11:
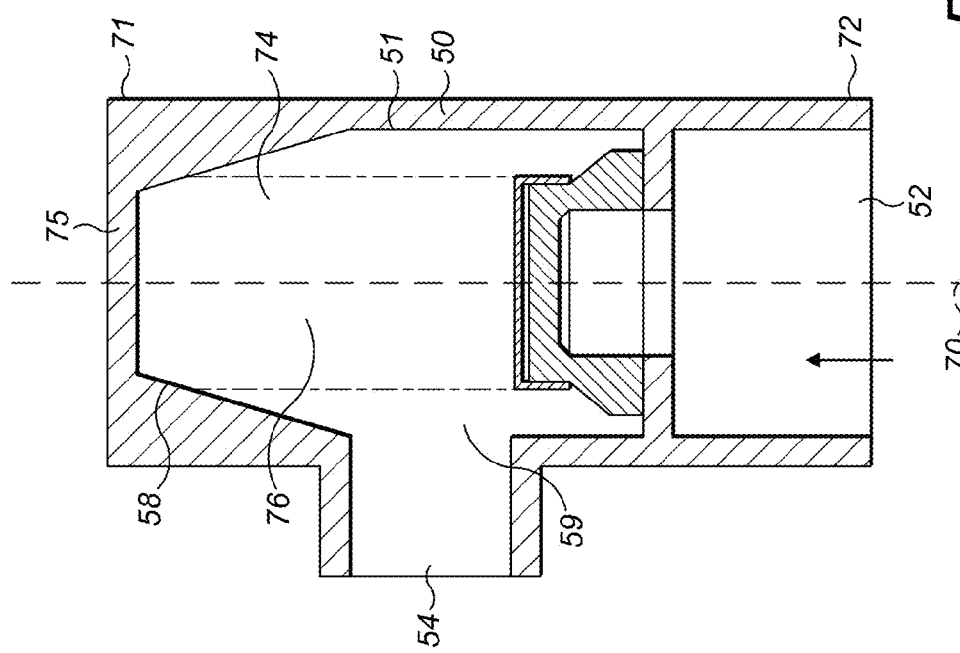

In the example shown in FIG. 11, the cavity, 74, can be seen as having an open end, 76, i.e. the entrance to the cavity, and an opposing closed end, 75, i.e. the 'dead end' of the cavity. The sidewalls of the cavity therefore extend between these open and closed ends. In this example, it can be seen that the plug, 10, is aligned with the open end, 76, of the cavity, so that upon fracture along the predefined fracture plane, the second section, 2, of the plug (which is then contained in the encapsulating means) detaches away from the first section, 1, and travels towards and into the open end of the cavity, 75.

In more detail, it can be said that the cavity has a longitudinal axis, 70, and that the plug has also a longitudinal axis extending between its first, 14, and second, 12, which is aligned with this axis of the cavity.

Figure 12:
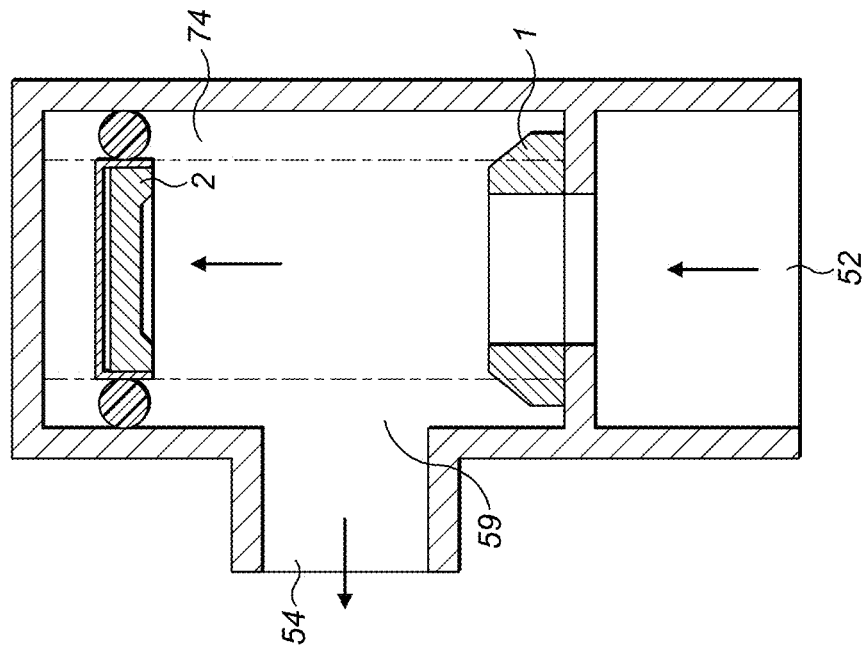
FIG. 12 shows an example of a means for retaining an encapsulating means within a valve body following fracture of the plug wherein the retention means comprises an O-ring.
Figure 12:
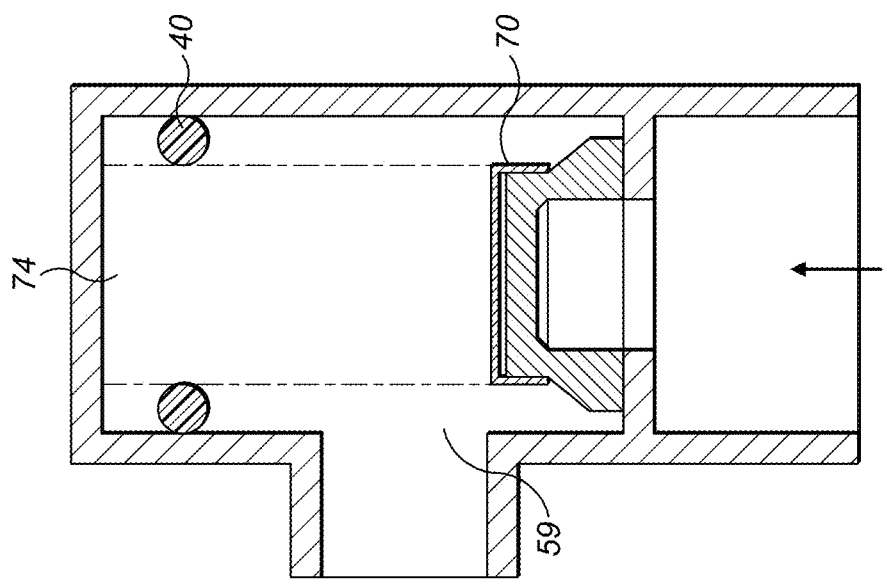

In the examples shown in FIGS. 11 and 12, the retention cavity further comprises means for gripping and retaining the encapsulating means in the cavity and therefore in a position within the valve body that does not lie in the flowpath between the inlet and outlet ports, after fracture of the plug.

In the example shown in FIG. 11, the gripping effect is caused by the retention cavity, 74, being tapered. The cavity in this example has a diameter that decreases in the direction away from the entrance, 76, to the cavity. This allows the detached encapsulating means to pass through the entrance of the cavity, where the diameter is larger, but to be gripped, further into the cavity, by the cavity walls. This gripping effect is achieved by the diameter of the cavity decreasing in the direction away from the entrance to a diameter that eventually corresponds to the outer diameter of the encapsulating means. These tapered walls, 58, therefore grip and retain the encapsulating means containing the releasable, second section, 2, of the frangible plug in a position within the valve body, 50, that does not obstruct the outlet port and/or lie in the flowpath, 59, between the inlet and outlet ports, 52, 54, after fracture of the plug.

An alternative to this example is shown in FIG. 12, wherein instead of comprising a tapered retention cavity the gripping means comprises a retainer and either or both of the retainer and the encapsulating means are deformable. For example, the retainer may be a rubber or elastomer retainer such as an O-ring, 40. Alternatively, the retainer may be a crinkle ring or washer. The encapsulating means may also be made from a material that deforms.

This gripping means acts in a similar manner to the tapered sidewalls, 58, of the example shown in FIG. 11, in that the retaining means present in the retention cavity, 74, may have a diameter and shape that corresponds to the detached and encapsulated section, 2, of the plug to thereby grip and retain the detached section of the plug in a position that does not obstruct the outlet port and/or lie in the flowpath, 56, between the inlet and outlet ports.

Examples of tapered cavities are shown in FIG. 11. The valve body of the example shown in FIG. 11 can be seen as having a first end, 71, and an opposing second end, 72, with a longitudinal axis, 70, extending therebetween (which corresponds, in this example, to the longitudinal axis of the cavity). The first end, 71, comprises the closed wall, 75, of the cavity, i.e. a dead end within the valve body, 50, whereas the inlet port, 52, is provided at the second, 72, opposing, end of the valve body. The valve body further comprises an outlet port, 54, and a frangible plug, 10, as described above, is positioned in the valve body between the inlet port and the outlet port, to either prevent or enable flow communication between the inlet port and the outlet port of the valve body, depending on whether it is intact or broken. An encapsulation means, in this example, being a cap, 70, is provided on and encapsulates, the second, detachable section of the plug, as shown in FIG. 11.

In the examples shown in FIGS. 11 and 12, the inlet port is located at the second end, 72, of the valve body and has a central axis that is aligned with the longitudinal axis of the cavity and the outlet port is located on the side of the valve body, and has a central axis that is generally perpendicular to the longitudinal axis. This is not necessary, however, and the inlet and outlet ports can be positioned differently. The outlet port in these examples is positioned between the first end, 71, and second end, 72, of the valve body. The retention cavity, 74, is formed between the outlet port, 54, and the first end, 71, of the valve body.

Upon fracture of the frangible plug, 10, the substance passing through the valve body from the inlet port to the outlet port forces the detached, second, encapsulated section, 2, of the frangible plug, 10, along the longitudinal axis, 70, away from the inlet port, 52, and past the outlet port, 54, and towards and into the retention cavity, 74, provided at the first end, 71, of the valve body, where it is then retained away from the outlet port by being gripped by the gripping means, (e.g. the tapered sidewalls, 58, or by deformable gripping means).

As can be seen in FIG. 11, since the retention cavity, 74, is provided between the first end, 71, and the outlet port, 54, i.e. in a position that does not obstruct the outlet port and/or lie in the flowpath, 59, between the inlet and outlet ports, and since the retaining means, or the tapering of the sidewalls of the cavity also does not occur until a position that is between the outlet port, 54, and the first end, 71, the movement of the encapsulated section, 2, of the plug away from both the inlet, 52, and outlet, 54, ports is not hindered. Due to this, the flowpath of the substance to be discharged is also not blocked, obstructed, or hindered by this detached and encapsulated part of the plug.

Figure 13:
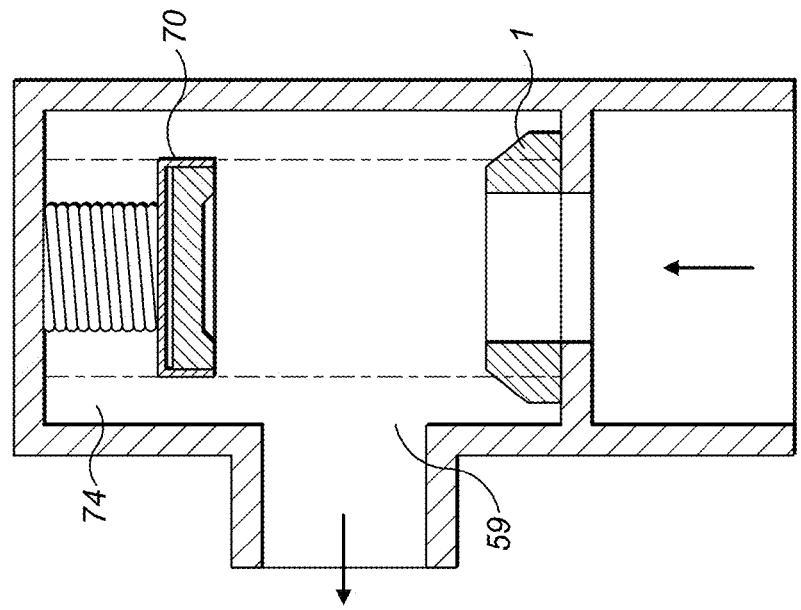
FIG. 13 shows an example of a means for retaining an encapsulating means within a valve body following fracture of the plug, which comprises a spring.
Figure 13:
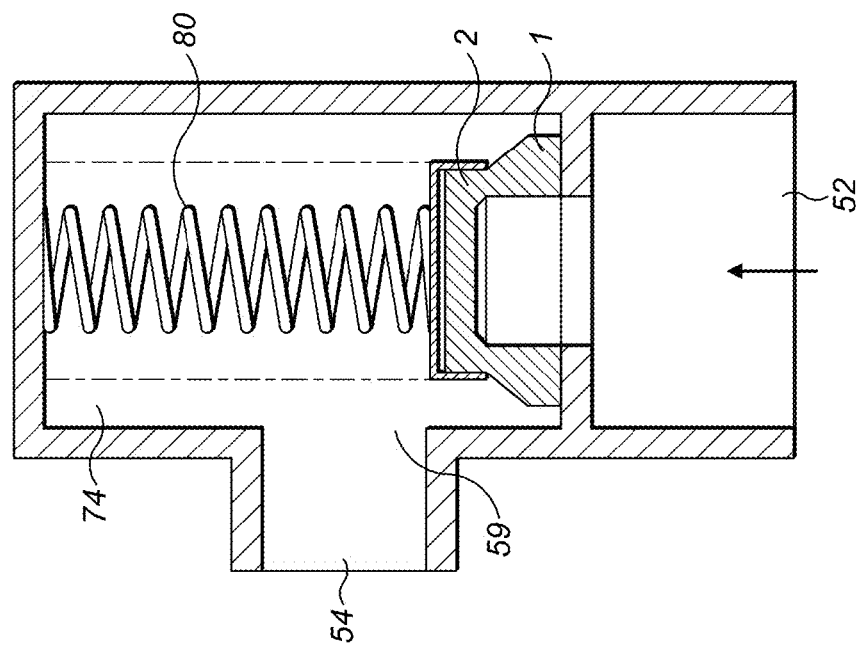

FIG. 13 depicts a further alternative means for retaining the detached section, 2, of the plug within the valve body and away from the outlet port, 54. In this example, the retaining means comprises an attachment means for physically attaching the encapsulating means to an inner surface of the valve body. This could be any inner surface, as long as the encapsulating means is thereafter retained in the valve body in a position that does not lie in the flowpath between the inlet and outlet ports after fracture of the plug. In the example shown in FIG. 13, the attachment means is provided in the retention cavity, 74, and therefore physically attaches the encapsulating means to the retention cavity. The attachment means is configured to pull the encapsulated section, 2, of the plug away from both the inlet and outlet port after fracture. The encapsulating means is thereafter again retained in a position that does not obstruct the outlet port, 54, or the inlet port, 52, or the flowpath, 59, therebetween. One example of this, as shown in FIG. 13, may be a spring, 80. A coiled spring, 80, is depicted in this figure, however, any spring element could be used.

Figure 14:
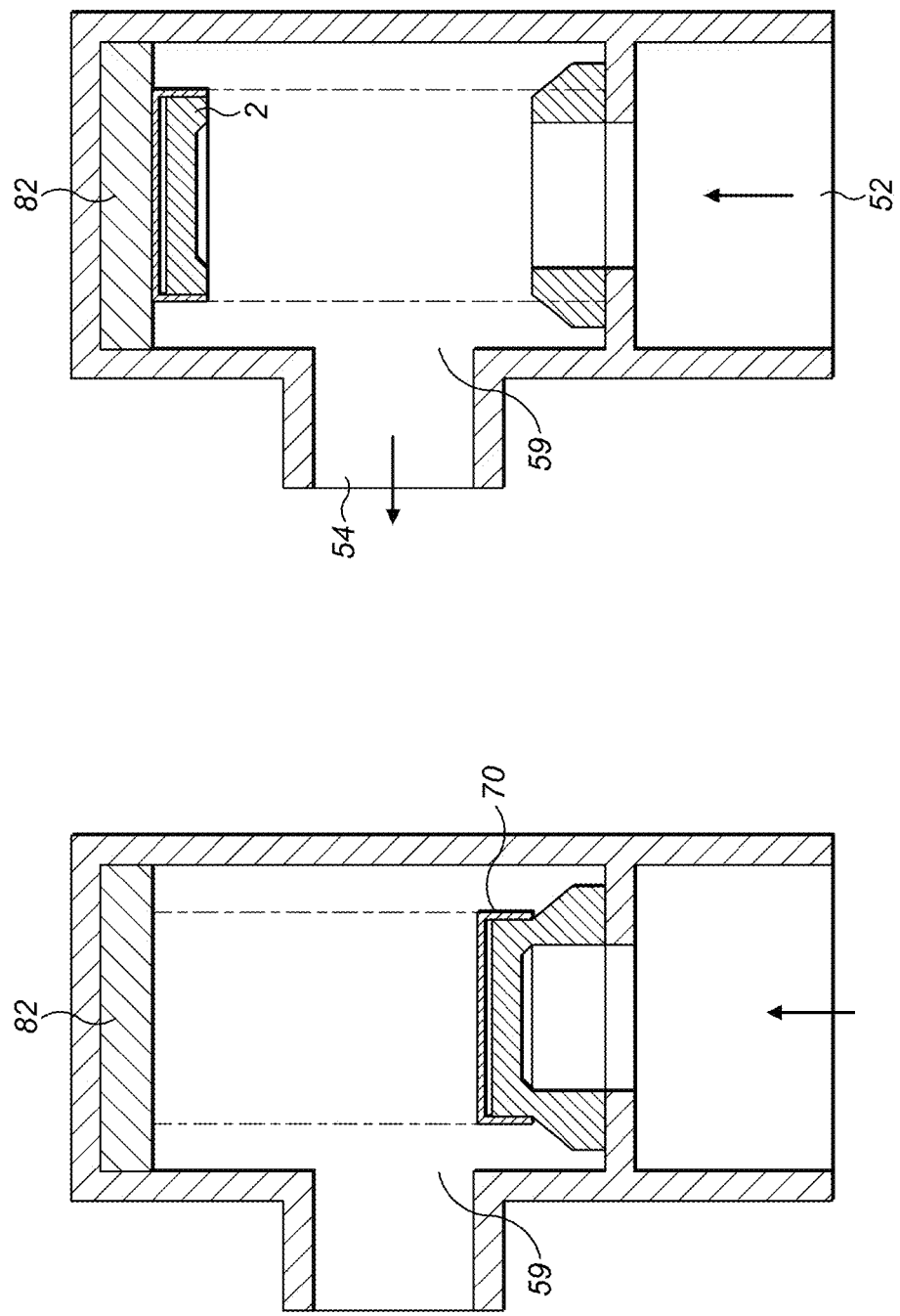
FIG. 14 shows an example of a means for retaining an encapsulating means within a valve body following fracture of the plug, which comprises the use of a magnetic force.

Alternatively, as shown in FIG. 14, instead of a spring, 80, a magnetic force could be used to retain the encapsulated section, 2, of the plug away from the outlet port, 54, after it has fractured. In one example, as shown in FIG. 14, the encapsulating means, e.g. a cap, 70, is made of a magnetic material, and a magnet, 82, is provided above the inlet port, 52 (FIG. 14). In this example, the magnet is positioned with a retention cavity, 74. Alternatively, the magnet could be provided on the encapsulating means provided on the plug, and the magnetic material could be provided in the retention cavity, or other internal surface of the valve body. The magnet could be a permanent magnet or an electro magnet, or any other type of magnetic means that is able to attract the magnetic encapsulating means thereto.

Although in the examples shown in FIGS. 13 and 14 a retention cavity is shown, this is not necessary, and when used with a valve body having a different design, the attachment means could be used to pull the encapsulating means to another position within a valve body that does not lie in the flow path between the inlet and outlet ports. The orientation of the capture and retention mechanism of these examples relative to the plug, or inlet, 52, and outlet, 54, ports is also not important, as these are able to attract or pull the encapsulated section of the plug to any desired position that is outside of the flowpath between the inlet and outlet ports.

Therefore, although in FIGS. 13 and 14, the same type of valve body is used as in FIGS. 11 and 12, these two types of attachment means could also be used in a valve body wherein the outlet port, 54, is not provided on a side wall of the valve body, or wherein the retention cavity, 74, comprising the spring or magnetic means is not positioned at the first end, 71, of the valve body, e.g. on a sidewall of the valve body, and wherein the spring or magnetic means does not pull or attract the encapsulated section of the plug along the longitudinal axis, 70.

The retention means is therefore adapted to retain the detached section of the plug in a position within the valve body that is not in the flowpath between the inlet port and the outlet port. This provides advantages in that the detached section of plug does not impede flow to the outlet port.

In addition to above, a clear benefit of the use of a frangible plug is the ability to form a hermetic seal between the frangible plug, 10, and the body of the valve. New hermetic seals and new methods of forming a hermetic seal that can be used with the plugs described herein is therefore also hereinafter described.

Figure 15:
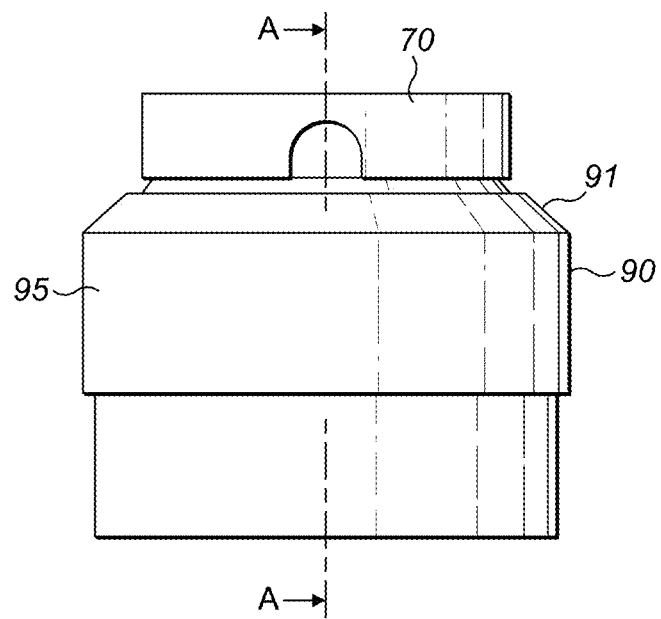
FIG. 15 shows an example of a frangible plug comprising an example of a support ring for forming a hermetic seal between the body of a valve and the frangible plug
Figure 16:
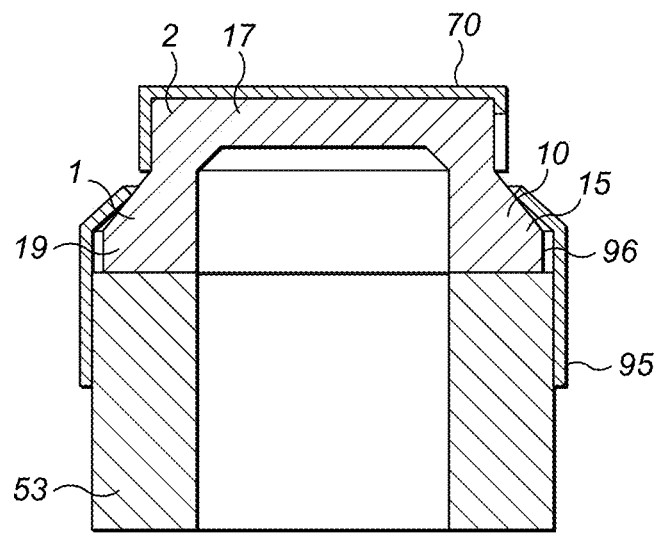
FIG. 16 shows internal cross section view of the support ring of FIG. 15.
Figure 18:
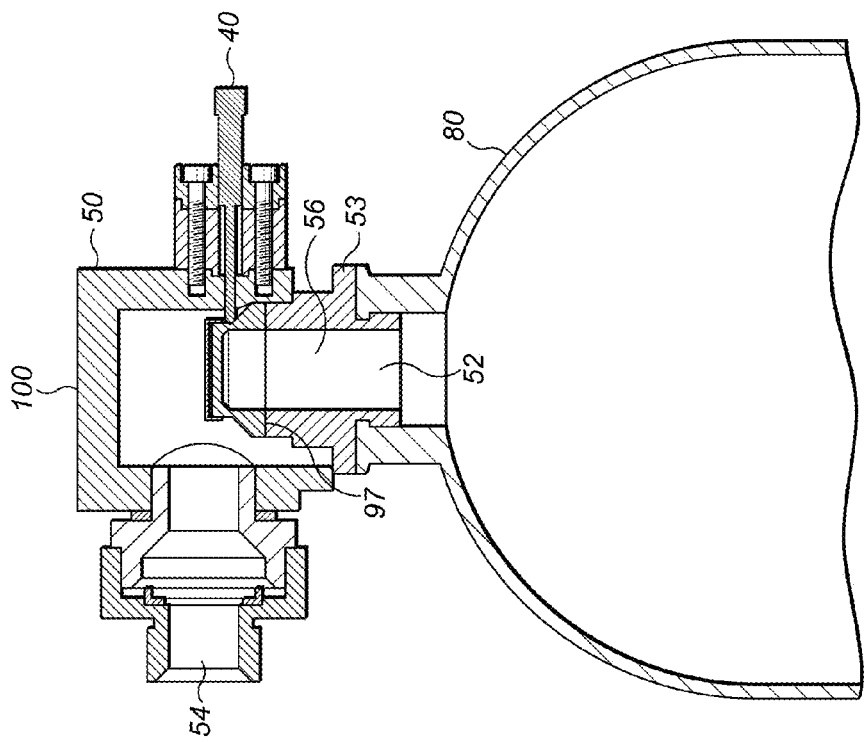
FIG. 18 shows a cross section of the valve mechanism of FIG. 17, further showing an example of a metal support ring in place.
Figure 17:
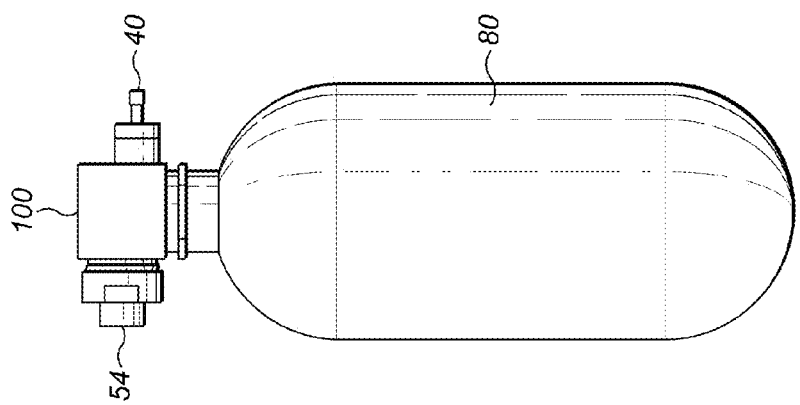
FIG. 17 shows a valve mechanism as described herein, attached to a cylinder.

A first example of a new sealing means is shown in FIGS. 15 and 16. This new sealing means may be used in a valve assembly as shown in FIGS. 17 and 18. FIG. 17 depicts a valve assembly that comprises a valve mechanism as previously described. In this example, the valve body further comprises a welding ring, 53, that is attachable to a cylinder, 80 (see FIG. 18), the cylinder containing the substance to be released through the valve mechanism.

In FIGS. 15 and 16 it can be seen that the new sealing means comprises a metal support ring, 95, that is provided on the first section, 1, of the plug, as described above, for forming a seal with the welding ring of the valve body. In this example the support ring follows the contours of the outer surface, 30, of this first section, 1, of the plug. It comprises a hollow cylinder with a first portion of generally uniform diameter, 90, which covers a part of the corresponding portion, 19, of the outer surface of the plug, and further comprises a second, bevelled portion, 91, which covers a part of the corresponding bevelled portion, 15, of the plug. As can be seen in FIGS. 15 and 16, the metal support ring does not extend all the way to the junction between the bevelled portion, 15, and the smaller diameter end portion, 17, as this is the point at which the predefined plane of fracture, 90, intersects the sidewall, 16, of the plug and therefore corresponds to the plane across which the plug will fracture. Leaving this section uncovered also allows the impact force to be provided directly to at least a point on the predefined fracture plane, 90.

The hermetic seal between this support ring and the valve body may be created by the formation of a bond, 96, between the frangible plug and the metal support ring, 95, as shown in FIG. 16. As described above, in some examples, the frangible plug may be formed from a brittle ceramic, vitreous or polymeric material. In the case of a ceramic or vitreous plug, standard brazing techniques, 96, may be used to attach the plug to the metal support ring, 95. This can be achieved using active brazing alloy techniques, one specific example of which is the 'moly-manganese' process. In the case of all materials, the joint/seal, may also be made with a suitable high temperature adhesive. In order to prevent stress and potential fracture of the frangible plug or disc through differential thermal expansion the thermal expansion coefficient of the metal must closely match that of the frangible plug. In the case of an alumina ceramic suitable metals include Invar™ and Kovar™.

Figure 19:
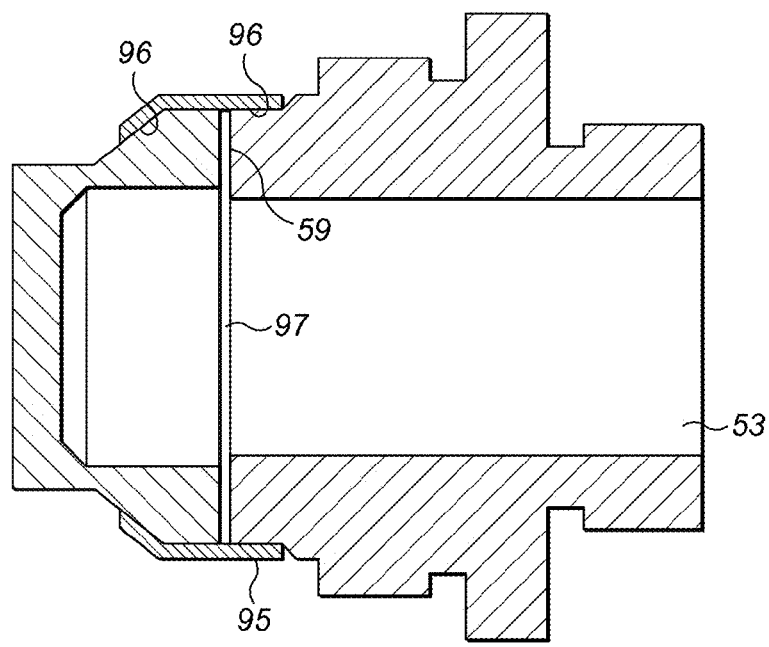
FIG. 19 shows a cross section of the plug and welding ring with the metal support ring in place.

The metal support ring may also be attached to the welding ring, 53, (see FIG. 16). In this example, the metal ring may be sized so as to extend further past the second end of the frangible plug, so that the inner surface of the metal support ring can then be attached to the outer surface of the welding ring, as shown in FIGS. 15, 16 and 19. Standard precision welding techniques such as TIG, electron beam or laser are used for this. Welding is the preferred method to join the support ring to the welding ring provided at the inlet port of the valve body since this only produces localised heating during application which does not weaken the braze attaching the support ring to the ceramic or vitreous plug.

Figure 22:
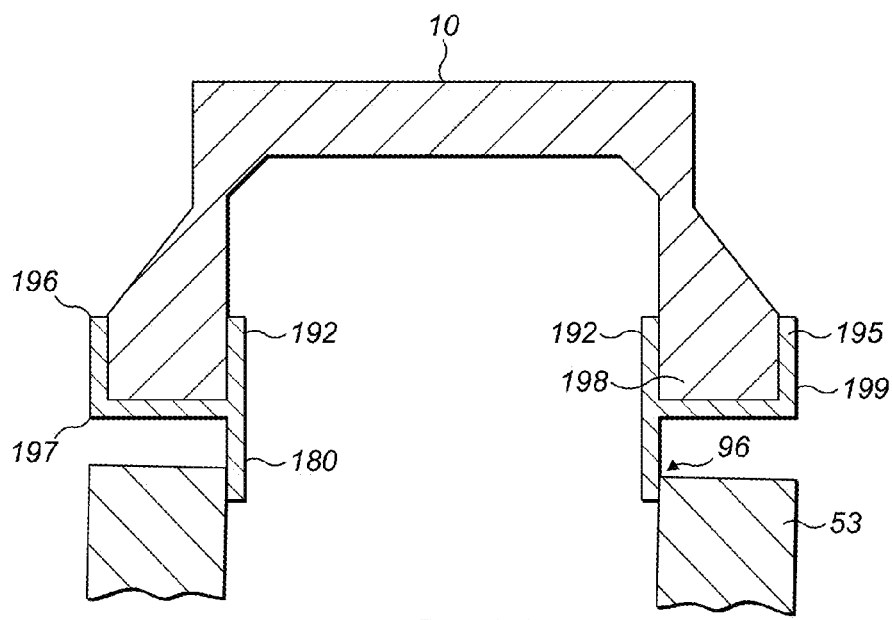
FIG. 22 shows another example of a method of bonding the ring of FIG. 20 to the valve body.
Figure 23:
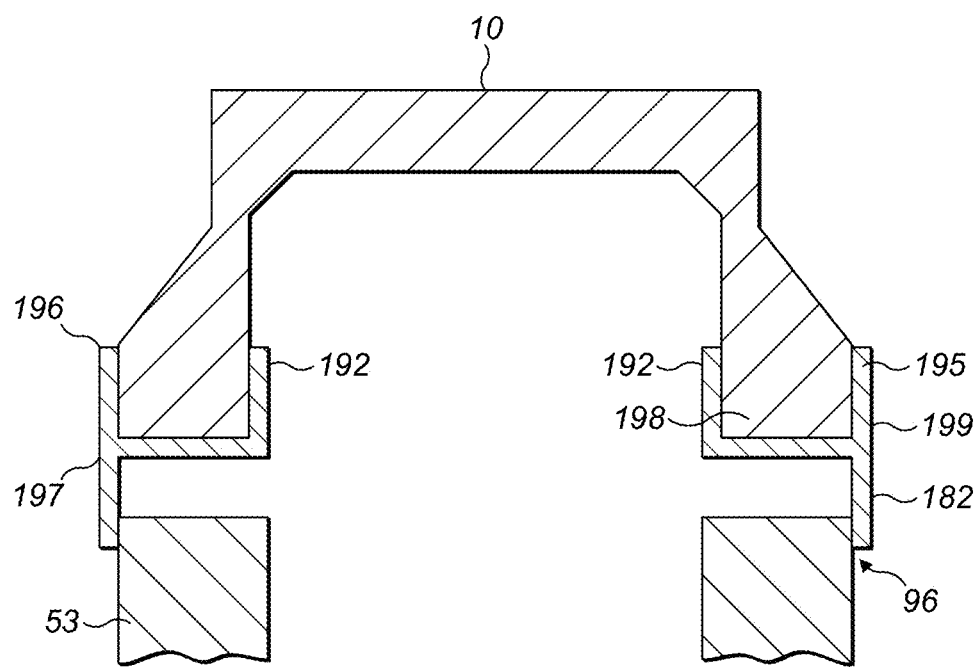
FIG. 23 shows another example of a method of bonding the ring of FIG. 20 to the valve body.

As shown in FIGS. 19, 22 and 23, a nominal gap, 97, may be provided between the second end of the frangible plug and the first end, 59, of the welding ring. This acts to reduce the stress on the braze joints caused by mismatch in the thermal expansion coefficients of the constituent parts. For an alumina ceramic disc, the material may comprise a 42% NiFe alloy (i.e. NiLo ally 42). The welding ring may be formed from mild steel to facilitate welding to a mild steel cylinder.

As can be seen in FIGS. 17 to 19, the passageway, 56, extending from the inlet port, 52, of the valve body, therefore extends from the inlet port of the welding ring, and to the plug, where it is then blocked by the plug. The metal support ring in this example therefore extends around the circumference of both the plug and the welding ring and provides a seal between the outer cylindrical sidewall of the plug and the outer surface of the welding ring. This therefore seals the passageway between the inlet port and the outlet port.

Figure 20:
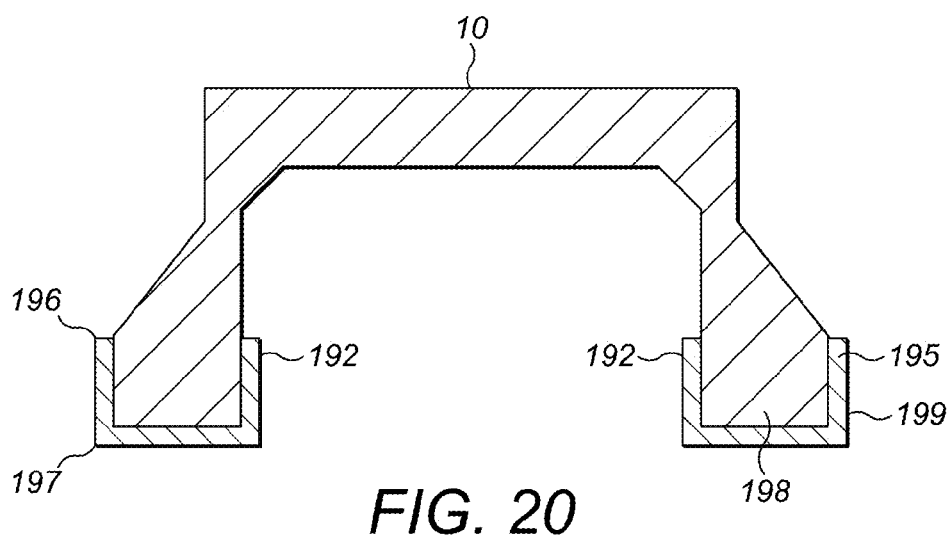
FIG. 20 shows another example of a metal support ring.

Another example of a metal support ring, 195, is shown in FIG. 20. In this example, it can be seen that the metal support ring is again provided on the first section, 1, of the plug, but instead of being a hollow cylindrical support ring that extends only around the outer circumference of the plug, this support ring further covers the surface, 11, at the second end, 14, of the plug, as well as a part of the inner sidewall surface of the recess, 22, of the plug.

This support ring could be described as having a first side, 197, and an opposing second side, 196, and an outer circumferential surface, 199, and an inner circumferential surface, 192, extending therebetween. The first side, 196, comprises a channel, 198, formed therein, the shape and size of which reflects the size and shape of the second end of the plug, as shown in FIG. 20.

Figure 21:
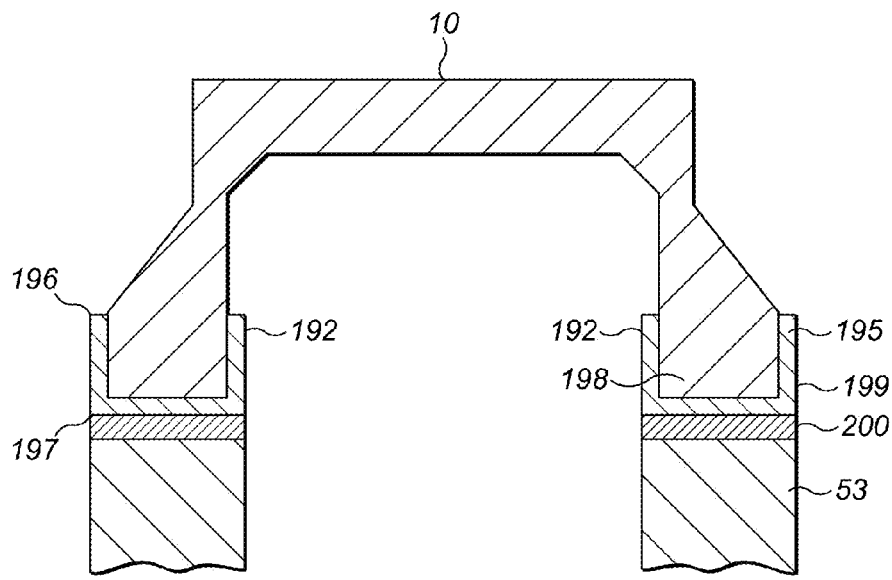
FIG. 21 shows an example of a method of bonding the ring of FIG. 20 to the valve body.

In this example, the channel, 198, can be seen as having a U-shaped cross section, although this may differ, depending on the shape and size of the plug used. The second end, 12, of the plug may therefore be slotted into this channel, as shown in FIG. 20 and bonded thereto. The metal support ring may further be bonded to the welding ring of the valve body as shown in FIGS. 21 to 23. In FIG. 20, the second side, 196, of the metal support ring is bonded via a metal to metal braze, 200, to the welding ring, 53. In this example, no nominal gap is provided between the plug and the welding ring.

In the example shown in FIG. 22, the inner circumferential surface, 192, may comprise a wall, 180, that extends from the first side, 196, in the direction of the second side, 197, of the ring, and then further on and past the second end, 197, of the ring, to form an inner tubular projection, 180, which can then be bonded to the inner surface of the welding ring, 53, to form the seal. In this example, the seal may be created due to a weld or braze.

In the example shown in FIG. 23, it is the outer circumferential surface, 199, that has a wall, 182, that extends from the first side, 196, of the ring in the direction of the second side, 197, of the ring, and then further on and past the second end, 197, of the ring, to form an outer tubular projection which can then be bonded to the outer surface of the welding ring, 53, to form the seal. In this example, the bond may be a weld.

This new method of forming a seal therefore comprises providing a metal support ring which is bonded to the first section, 1, of the frangible plug, and which is further bonded to a section of the passageway which is in fluid communication with the inlet port, 52.

The frangible plug may be formed from a brittle ceramic, vitreous or polymeric material. For an alumina ceramic disc, the material may comprise a 42% NiFe alloy (i.e. NiLo alloy 42). The direct bond between the metal support ring and the frangible plug may be formed using a brazing technique. This brazing technique may comprise the 'moly-manganese' process, however, other techniques may also be used. The direct bond between the metal support ring and the frangible plug may also be formed using an adhesive.

The metal support ring may be made from a metal that has a thermal expansion coefficient that closely matches the thermal expansion coefficient of the frangible plug. In one example, the frangible plug may comprise an alumina ceramic and the metal ring may comprise Invar™ or Kovar™.

Standard precision welding techniques, such as TIG, electron beam or laser may be used to attach the metal support to the valve body. Other techniques may also be used.

The welding ring may be formed from mild steel, aluminium, stainless steel, titanium or nickel to facilitate welding to a mild steel cylinder. The alloy for the welding ring to bond to a cylinder may also be made from the same materials. Cylinders may alternatively be made from materials such as stainless steel, titanium, etc. and the welding ring material chosen to match the cylinder material.

These new seals replace the O-ring seal that is usually found in such valve mechanisms with a direct bond between a metal support ring and the material of the frangible plug. This seal could be used with any shaped plug, and is not limited to the top hat shaped plug described herein.

These new types of seals provide significant advantages over known valve mechanisms as they provide the option for hermiticity whilst also minimising the number of components and complexity of the valve design and therefore reducing the cost and providing higher reliability.

The invention claimed is:

1. A valve mechanism comprising:
   a valve body having an inlet port and an outlet port and a passageway extending therebetween; and
   a frangible plug held within the valve body the plug blocking said passageway;
   wherein said plug comprises a predefined fracture plane and wherein said plug is configured to fracture across said predefined fracture plane upon application of an impact force:
   wherein the plug includes a first end and an opposing second end and a cylindrical sidewall having an outer surface extending therebetween;
   wherein the first end has a first surface that is in flow communication with the outlet port and the second end has a second surface that is in flow communication with the inlet port;
   wherein the predefined fracture plane intersects the side wall of the plug to provide a predefined fracture line that extends around the outer circumference of the sidewall of the frangible plug; and
   wherein the second surface comprises:
   a recess, having an open end at the second end of the plug; and
   a closed end, within the plug, with an inner surface of the cylindrical sidewall extending therebetween, said predefined fracture plane intersecting the sidewall within the recess to provide a predefined fracture line that extends around the inner circumference of the sidewall of the frangible plug.

2. The valve mechanism of claim 1,
   wherein the diameter of the recess is smaller at the closed end of the recess than at the open end of the recess;
   wherein the outer surface of the sidewall has a first bevelled portion,
   and the inner surface of the side wall has a second bevelled portion; and
   wherein a part of the bevelled portion of the outer surface that has the smallest diameter lies in the same plane as a part of the bevelled portion of the inner surface that has the greatest diameter.

3. The valve mechanism of claim 1,
   wherein the diameter of the recess is smaller at the closed end of the recess than at the open end of the recess;

wherein the outer surface of the sidewall has a first bevelled portion,
and the inner surface of the side wall has a second bevelled portion; and
wherein a part of the bevelled portion of the outer surface that has the smallest diameter lies in the same plane as a part of the bevelled portion of the inner surface that has the greatest diameter.

4. The valve mechanism of claim 1 further comprising:
means for encapsulating a section of said plug, said encapsulating means being configured to retain said section of the plug therein upon fracture of said plug across the predefined fracture plane.

5. The valve mechanism of claim 4 further comprising:
means for retaining said section of plug and/or encapsulating means in a position within said valve body that does not lie in a flowpath between the inlet and outlet ports, after fracture of said plug.

6. The valve mechanism of claim 5, wherein said retaining means comprises a retention cavity that is provided in the valve body in a position that does not lie in the flowpath between the inlet and outlet port, for retaining, after fracture of the plug, the encapsulating means in a position within the valve body that does not lie in the flowpath between the inlet and the outlet port.

7. The valve mechanism of claim 6, wherein the cavity has an entrance and wherein the plug is positioned within the valve body so that it is axially aligned with said entrance to the cavity, and wherein the retention cavity comprises means for gripping and retaining the encapsulating means in said cavity and in a position within the valve body that does not lie in the flowpath between the inlet and outlet ports, after fracture of the plug.

8. A valve mechanism comprising:
a valve body having an inlet port and an outlet port and a passageway extending therebetween;
a frangible plug held within the valve body the plug blocking said passageway;
wherein said plug comprises a predefined fracture plane and wherein said plug is configured to fracture across said predefined fracture plane upon application of an impact force;
means for encapsulating a section of said plug, said encapsulating means being configured to retain said section of the plug therein upon fracture of said plug across the predefined fracture plane; and
means for retaining said section of plug and/or encapsulating means in a position within said valve body that does not lie in a flowpath between the inlet and outlet ports, after fracture of said plug;
wherein said retaining means comprises a retention cavity that is provided in the valve body in a position that does not lie in the flowpath between the inlet and outlet port, for retaining, after fracture of the plug, the encapsulating means in a position within the valve body that does not lie in the flowpath between the inlet and the outlet port;
wherein the cavity has an entrance and wherein the plug is positioned within the valve body so that it is axially aligned with said entrance to the cavity, and wherein the retention cavity comprises means for gripping and retaining the encapsulating means in said cavity and in a position within the valve body that does not lie in the flowpath between the inlet and outlet ports, after fracture of the plug; and
wherein the means for gripping the encapsulating means after fracture of the plug comprises said retention cavity having a diameter that decreases in a direction away from the entrance to the cavity, said diameter decreasing to a diameter that corresponds to the diameter of the encapsulating means to thereby grip and retain the encapsulating means in a position within the valve body that does not lie in the flowpath between the inlet and outlet ports, after fracture of the plug.

\* \* \* \* \*